(No Model.)
H. BROOME.
LAWN MOWER CLUTCH.
No. 497,944. Patented May 23, 1893.
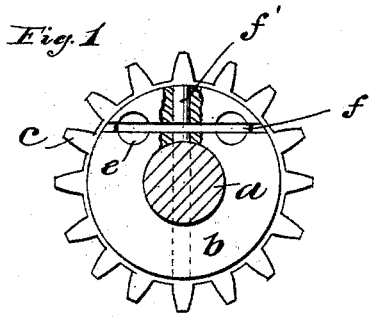
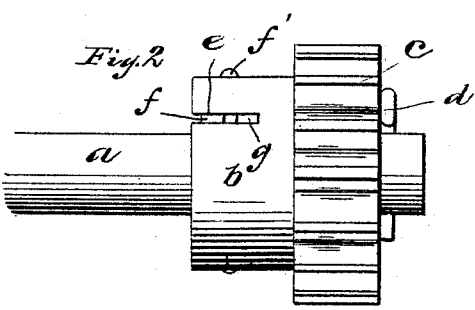
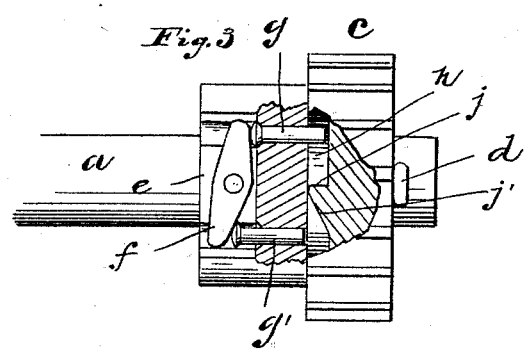
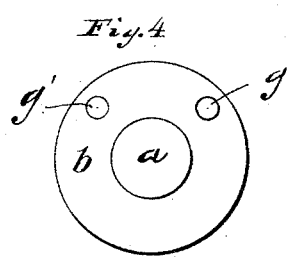
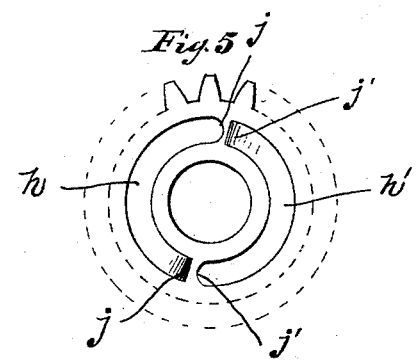
WITNESSES:
INVENTOR
BY
ATTORNEYS
THE NORRIS PETERS CO., PHOTO-LITHO., WASHINGTON, D. C.

UNITED STATES PATENT OFFICE.

HENRY BROOME, OF SPRINGFIELD, OHIO, ASSIGNOR TO AMOS WHITELEY, OF SAME PLACE.

LAWN-MOWER CLUTCH.

SPECIFICATION forming part of Letters Patent No. 497,944, dated May 23, 1893.

Application filed March 18, 1893. Serial No. 466,620. (No model.)

*To all whom it may concern:*

Be it known that I, HENRY BROOME, a citizen of the United States, residing at Springfield, in the county of Clark and State of Ohio, have invented certain new and useful Improvements in Lawn-Mower Clutches, of which the following is a specification.

My invention relates to improvements in lawn mower clutches; and the object of my invention is to provide a simple clutch device which will positively be engaged by a forward rotation of the driving wheel and disengaged by the backward revolution of the wheel.

My invention consists in the various constructions and combinations of parts hereinafter described and pointed out in the claims.

In the accompanying drawings Figure 1 is an end elevation partly broken away of a device embodying my invention. Fig. 2 is a side elevation of the same. Fig. 3 is a view, partly in section, showing the arrangement of the engaging devices. Fig. 4 is a face view of the clutch collar and Fig. 5 is a similar view of the clutch pinion.

Like parts are represented by similar letters of reference in the several views.

In the said drawings $a$, represents the supporting shaft which corresponds to the reel shaft in a lawn mower.

$b$, is the clutch collar which is secured rigidly thereto, in the manner hereinafter more fully specified.

$c$, is the pinion arranged adjacent to the clutch collar $b$, and adapted to turn loosely on the shaft $a$; said pinion being held against longitudinal movement on the shaft by the said collar $b$, on one side and a pin $d$, or other suitable retaining device on the opposite side.

The clutch collar $b$, has formed in its face, which is farthest removed from the pinion $c$, a transverse slot $e$, arranged outside of the circumference of the shaft $a$, and in this slot is pivoted a vibrating lever $f$; the lever being held in position by a pin $f'$, which passes through the collar $b$, and the shaft $a$, and serves not only as the pivotal bearing for the lever $f$, but also as a fastening device for holding the clutch collar $b$, rigidly on the shaft $a$.

On opposite sides of the pin $f'$, are formed perforations which extend from the bottom of the slot through the collar, so as to open on the face which lies adjacent to the pinion $c$. These perforations are preferably countersunk at the end which lies within the slot $e$; the slot being enlarged from this point outward into circular cavities adapted to receive loose pins $g$, $g'$, which fit in the perforations extending through the collar; said pins being provided with enlarged heads adapted to fit in the countersunk portions of the perforations, which heads limit the movement of the pins through the perforations in the collar. The pinion has formed in its face, which is adjacent to the clutch collar, annular recesses $h$, $h'$, portions of which stand opposite to the perforations in the clutch collar when the pinion is in place on the shaft. These recesses are each formed at one end with a beveled or inclined approach $j$, and at the opposite end with a square seat or shoulder $j'$.

In assembling the parts the pins $g$, $g'$, are inserted in the perforations in the collar, after which the vibrating lever $f$, is placed in the slot $e$, and secured therein by the pin $f'$, which is driven through the collar and the shaft, thus serving the purpose of holding the pins $g$, $g'$, lever $f$, and collar $e$, all in their relative positions. The pinion $c$, is then slipped on the shaft and secured by the pin $d$. The respective ends of the vibrating lever rest against the pins $g$, $g'$, so that when one pin is pushed inwardly the other is forced outwardly from the face of the collar. The result of this construction is that one of the pins is always within one of the recesses $h$, $h'$. When the pinion is turned in a forward direction said pin engages against the shoulder $j'$, and causes the collar to revolve with the pinion. When the pinion is turned in the opposite direction the beveled approaches $j$, alternately cause the pins to recede from the face of the clutch collar, thus permitting the pinion to turn freely on the shaft.

It will be seen that by the above construction a very simple, cheap and effective clutch is produced. By having the slotted opening and the vibrating lever arranged wholly within the collar and away from the shaft $a$, the construction is much simplified.

Having thus described my invention, I claim—

1. In a clutch, the combination of the axle and the collar arranged thereon, a pinion adjacent to said collar, a vibrating lever located in a slotted bearing in said collar between the periphery of said collar and the periphery of said shaft, loose pins seated in bearings in said collar and adapted to engage the opposite ends of said vibrating lever, said pins being adapted to project through the face of said collar, a pinion having recessed openings in the face thereof adapted to receive said pins, said recessed openings being provided with alternately arranged beveled approaches and square bearing seats, substantially as specified.

2. The combination of a collar and shaft, the vibrating lever in the collar and the engaging pins having heads adapted to project through the ends of said collar and to be operated by said vibrating lever, a pinion having oppositely arranged heads and beveled approaches to engage said pins, and a fastening pin adapted to project through the collar, vibrating lever and shaft, substantially as specified.

3. The combination with a shaft, of a clutch collar pinned thereon, a vibrating lever adapted to oscillate on the pin which connects said collar to said shaft, loose pins having heads inserted through perforations in said collar, and a pinion having alternately arranged beveled approaches and engaging projections adjacent to said pins, and means for holding said pinion contiguous to said clutch collar, substantially as specified.

In testimony whereof I have hereunto set my hand this 1st day of March, A. D. 1893.

HENRY BROOME.

Witnesses:
ROBERT C. RODGERS,
FRANK WATT.